(12) United States Patent
Belmares

(10) Patent No.: US 6,335,976 B1
(45) Date of Patent: Jan. 1, 2002

(54) SYSTEM AND METHOD FOR MONITORING VISIBLE CHANGES

(75) Inventor: Robert J. Belmares, Dallas, TX (US)

(73) Assignee: Bomarc Surveillance, Inc., Dallas, TX (US)

( * ) Notice: Subject to any disclaimer, the term of this patent is extended or adjusted under 35 U.S.C. 154(b) by 0 days.

(21) Appl. No.: 09/258,056

(22) Filed: Feb. 26, 1999

(51) Int. Cl.$^7$ .................................................... G06K 9/00
(52) U.S. Cl. ......................... 382/103; 348/155; 382/236
(58) Field of Search ............................ 382/100, 236, 382/173, 103, 171, 172, 209, 217, 218, 232, 238, 239, 255, 274; 250/201.9, 204, 559.04; 348/152–155; 345/473, 474

(56) References Cited

U.S. PATENT DOCUMENTS

| | | | |
|---|---|---|---|
| 3,988,533 A | 10/1976 | Mick et al. | |
| 4,081,830 A | 3/1978 | Mick et al. | |
| 4,249,207 A | 2/1981 | Harman et al. | |
| 4,614,968 A | 9/1986 | Rattman et al. | |
| 5,099,322 A | 3/1992 | Gove | |
| 5,109,435 A * | 4/1992 | Lo et al. ........................ | 382/236 |
| 5,111,291 A | 5/1992 | Erickson et al. | |
| 5,121,201 A | 6/1992 | Seki | |
| 5,153,722 A | 10/1992 | Goedeke et al. | |
| 5,226,093 A * | 7/1993 | Iwase ............................ | 382/236 |
| 5,283,644 A | 2/1994 | Maeno | |
| 5,467,402 A | 11/1995 | Okuyama et al. | |
| 5,471,239 A | 11/1995 | Hill et al. | |
| 5,500,904 A * | 3/1996 | Markandey et al. ......... | 382/103 |
| 5,512,942 A | 4/1996 | Otsuki | |
| 5,594,813 A * | 1/1997 | Fandrianto et al. .......... | 382/236 |
| 5,600,737 A * | 2/1997 | Murakami et al. ........... | 382/232 |
| 5,818,969 A * | 10/1998 | Astle ............................. | 382/236 |
| 5,838,827 A * | 11/1998 | Kobayashi et al. .......... | 382/236 |

\* cited by examiner

Primary Examiner—Jayanti K. Patel
(74) Attorney, Agent, or Firm—W. Thomas Timmons

(57) ABSTRACT

A method for monitoring a field of view for visible changes is disclosed. A first image is taken in a predetermined manner of the field of view to be monitored, and then an array divides the first image into a plurality of cells. A second image is taken in the predetermined manner of the field of view to be monitored. The array is also applied to the second image, dividing the second image into the plurality of cells. Predetermined groups of cells of the second image are then compared to the same groups of cells of the first image, and the number of the groups of cells that changed from the first image to the second image is computed. In some situations only certain groups of cells are compared. In one form of the method, each cell of the first image is given a numerical value based upon the information in each cell, and each cell of the second image is also given a numerical value based upon the information in each cell. Each group of cells is also given a numerical value based on the numerical value of the cells within the group, such as the sum of the numerical values of the cells within the group. In one arrangement, each cell is a single picture element, known as a pixel. The numerical value of each group of cells is the sum of the brightness for the pixels in the group. In one such arrangement, the predetermined groups of cells comprises a single group. In one method, the number of the groups of cells which changed in numerical value by more than a predetermined amount is also computed.

16 Claims, 6 Drawing Sheets

Fig. 6

SYSTEM AND METHOD FOR MONITORING VISIBLE CHANGES

BACKGROUND OF THE INVENTION

1. Field of the Invention

The present invention relates generally to methods and apparatus for video or other photographic security systems.

2. Description of Related Art

Security systems using video cameras have been in use for many years.

U.S. Pat. No. 5,099,322 shows a system for detecting scene changes using a video security system. U.S. Pat. No. 5,471,239 show the system for using video frame compression and numerical comparison to detect scene changes.

SUMMARY OF THE INVENTION

In a method for monitoring a field of view for visible changes, according to the present invention, a first image is taken in a predetermined manner of the field of view to be monitored, and then an array divides the first image into a plurality of cells. The first image divided by the array is then stored, and a second image is taken in the predetermined manner of the field of view to be monitored. The array is also applied to the second image, dividing the second image into the plurality of cells. Cells are combined into predetermined groups. The groups could be individual cells, which is to say groups of one cell each. The groups could be rows of cells or columns of cells or rectangular groupings which in effect create larger cells. The predetermined groups of cells of the second image are then compared to the same groups of cells of the first image, and the number of the groups of cells that changed from the first image to the second image is computed. In some situations only certain groups of cells are compared. If a parrot is moving around in a cage, then the cells or the groups of cells which might show the parrot are not compared, or if there are several ceiling fans which are moving, then the cells or the groups of cells which show the ceiling fans might not be compared. There are also other ways of handling these problems which are also described.

In one preferred form of the method, each cell of the first image is given a numerical value based upon the information in each cell, and each cell of the second image is also given a numerical value based upon the information in each cell. Each group of cells is also given a numerical value based on the numerical value of the cells within the group. The simplest method is to make the numerical value of each group equal to the sum of the numerical values of the cells within the group, but manipulation would work as long as the numerical value of the group changes when the numerical value of its cells change. Computing how many groups of the cells changed from the first image to the second image is simply a matter of computing the difference between the numerical value of each group of cells in the second image and in the first image.

In one arrangement, each cell is a single picture element, known as a pixel. A pixel has a its own brightness ranging from 0 for black to a maximum value, typically 255, for white, and the numerical value of each cell is the brightness of the pixel. There is still a brightness number for color images, but color scales could also be used. The numerical value of each group of cells is determined by an image algorithm, which in one preferred form is simply taking the sum of the brightness for the pixels in the group. In one such arrangement, the predetermined groups of cells comprises a single group.

In one method according to the present invention, the number of the groups of cells which changed in numerical value by more than a predetermined amount is also computed.

One method, according to the present invention, also includes the step of comparing the number of the groups of cells that changed from the first image to the second image to a predetermined number. If the parrot moving in its cage, or a cat climbing on the furniture is small enough to never be in more than the predetermined number groups of cells, then if more than the predetermined number groups of cells changed, then it was not caused by the parrot or the cat.

Another method, according to the present invention, for monitoring a field of view for visible changes, includes the steps of taking a sequence of video images in a predetermined manner of the field of view to be monitored, creating a sequence of images, and creating an array which divides each of the images into a plurality of cells. Each image divided by the array is stored and the groups of cells of each image are compared to the same groups of cells of the other images. Again, this could just be predetermined groups of cells which are less than all of the groups of cells. It is then computed if there is a cyclical change in any of the predetermined groups of cells during the sequence. This cyclical change could be the rotation of a ceiling fan or the movement of a flower arrangement caused by the blowing of an air conditioner. Similar to that already described, each cell of each image is given a numerical value based upon the information in that cell, and each group of cells is given a numerical value based upon the numerical value of the cells within that group, and computing if there is a cyclical change in any of the predetermined groups of cells during the sequence becomes computing if there is a cyclical change in any of the numerical values of the predetermined groups of cells during the sequence. In a preferred form, the number of the predetermined groups of cells that changed from one image of the sequence to the next image of the sequence and was not part of a cyclical change is computed.

These and other objects, advantages and features of this invention will be apparent from the following description taken with reference to the accompanying drawing, wherein is shown a preferred embodiment of the invention.

BRIEF DESCRIPTION OF THE DRAWING

FIG. 6 is a representation of the first image and array of FIG. 3 showing the use of a preferred algorithm.

DESCRIPTION OF THE PREFERRED EMBODIMENT

Figure 1:
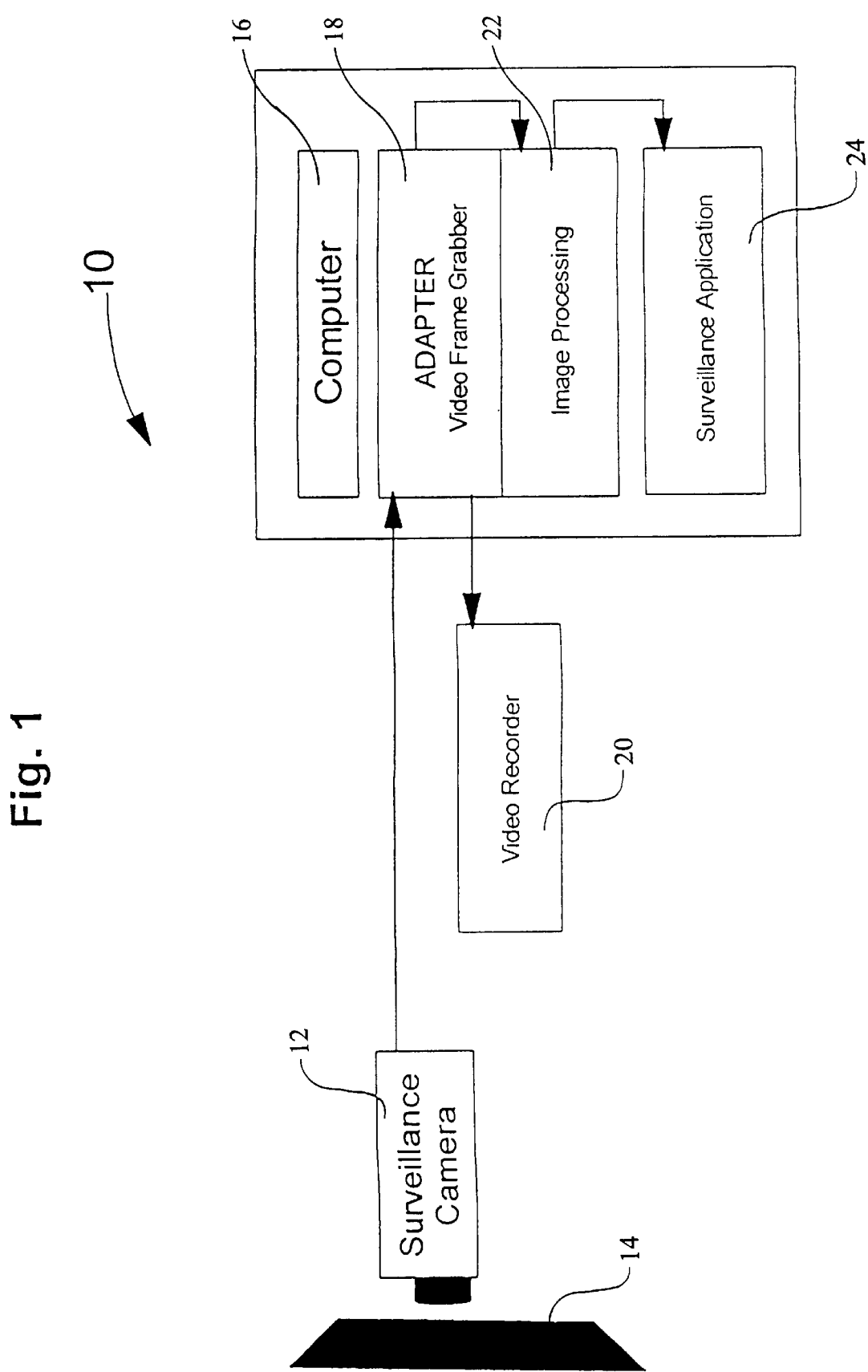
FIG. 1 is a block diagram representation of a system for monitoring a field of view for visible changes in accordance with a present invention.
Figure 2:
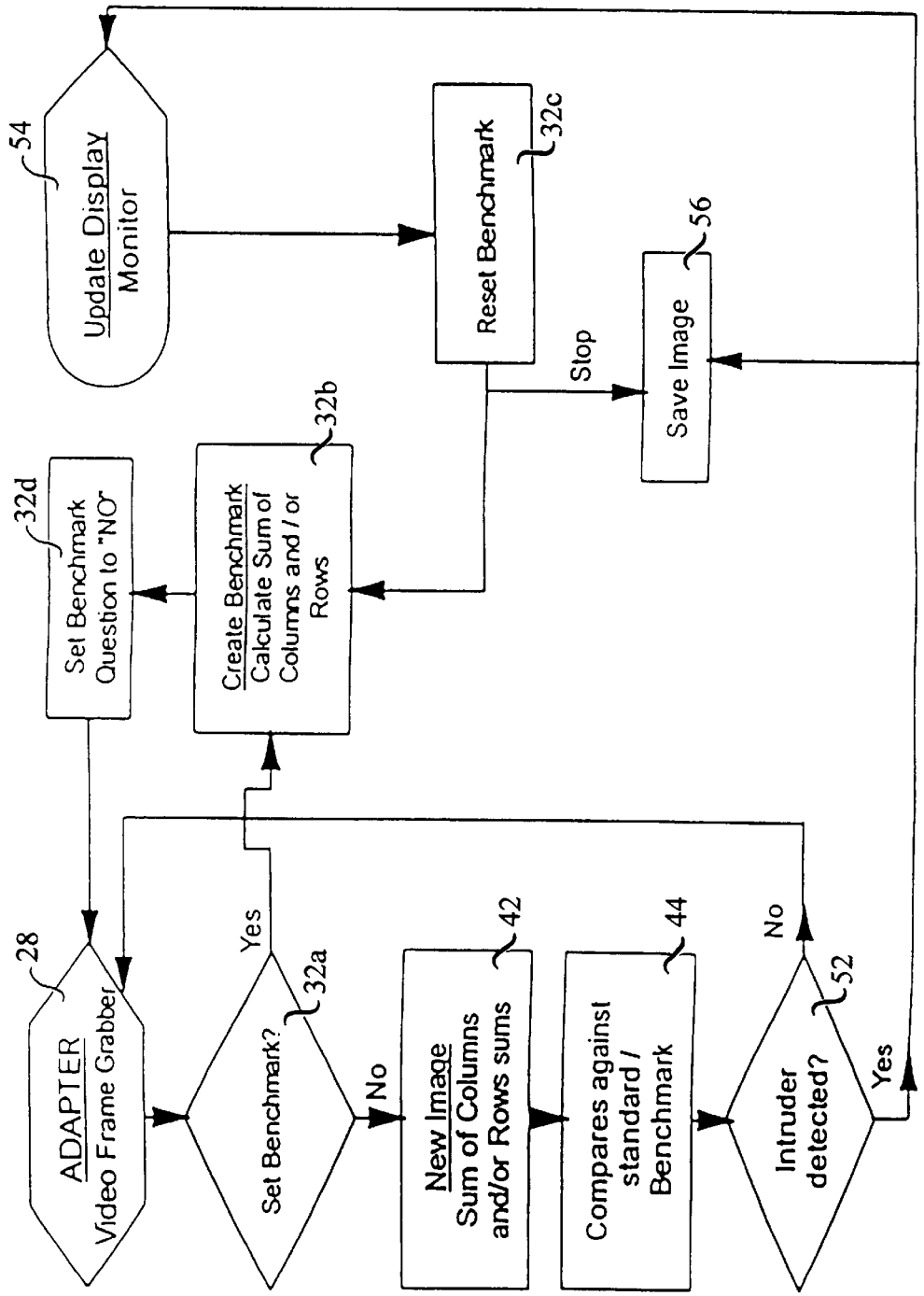
FIG. 2 is a flow diagram of a method for monitoring a field of view for visible changes in accordance with the present invention.
Figure 3:
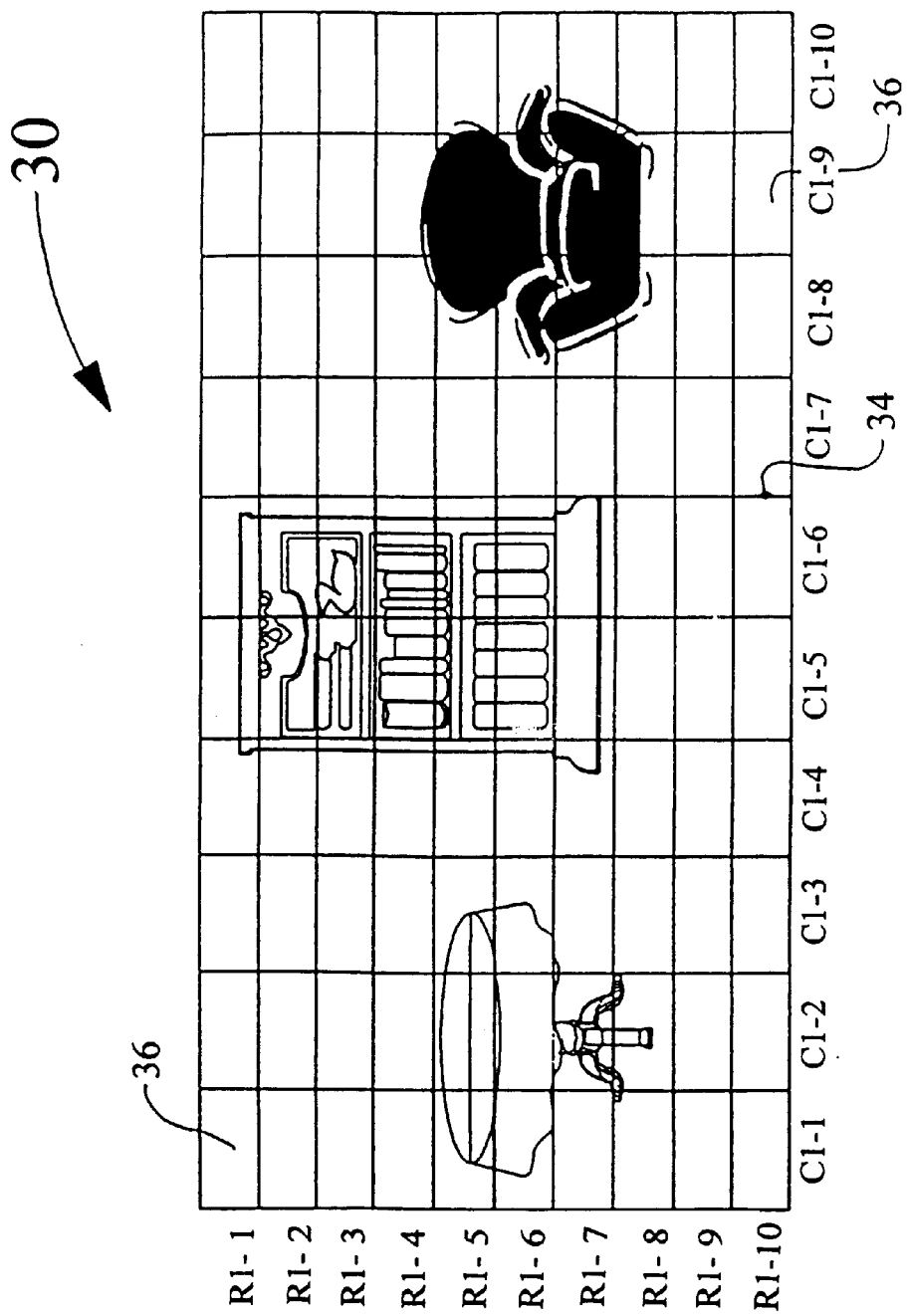
FIG. 3 is a representation of a first image and array in accordance with the present invention.
Figure 4:
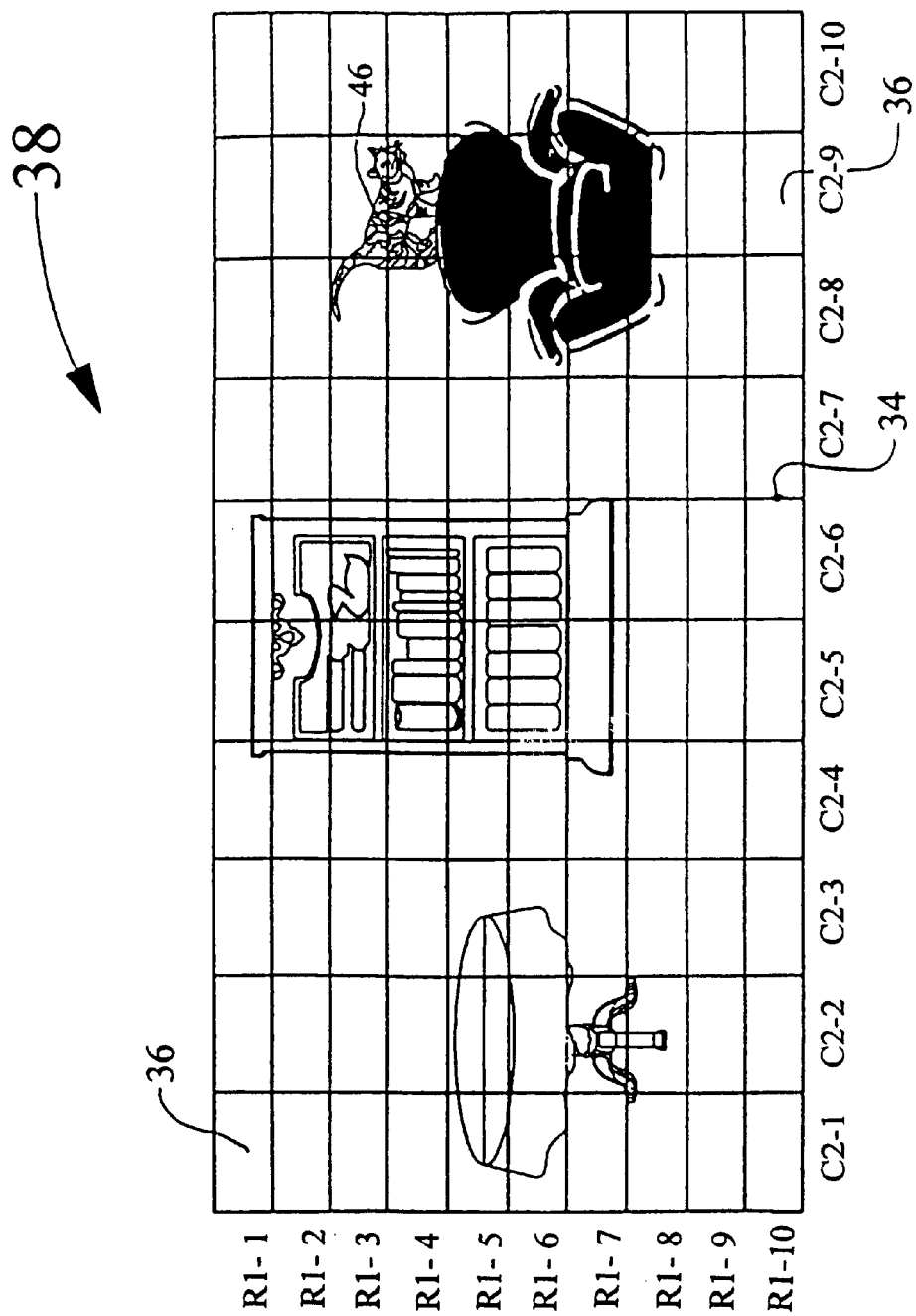
FIG. 4 is a representation of a second image and array in accordance with a present invention.

Referring now to the drawing, and in particular to FIG. 1, a system according to the present invention is referred to generally by reference to 10. Video camera 12 is in a fixed position and angle with respect to field of view 14 to be monitored and has a fixed lens, in the case illustrated, so that any image that it takes of field of view 14 will be identical except for changes in field of view 14 itself. Images from video camera 12 are fed to computer 16 where they are input as video images via video image grabber 18. Video image grabber 18 can be anything compatible with the particular video camera, such as a 256 gray scale or a red, green, blue (RGB) scale adapter. The video images are transmitted from video image grabber 18 to both video recorder 20 and image processor 22. Once each image has been processed, the information about that image is made available to the surveillance application program 24. Video recorder 20 can be a video cassette recorder (VCR) or a digital versatile disk (DVD, formerly "digital video disk") or some other kind of video recorder.

Figure 5:
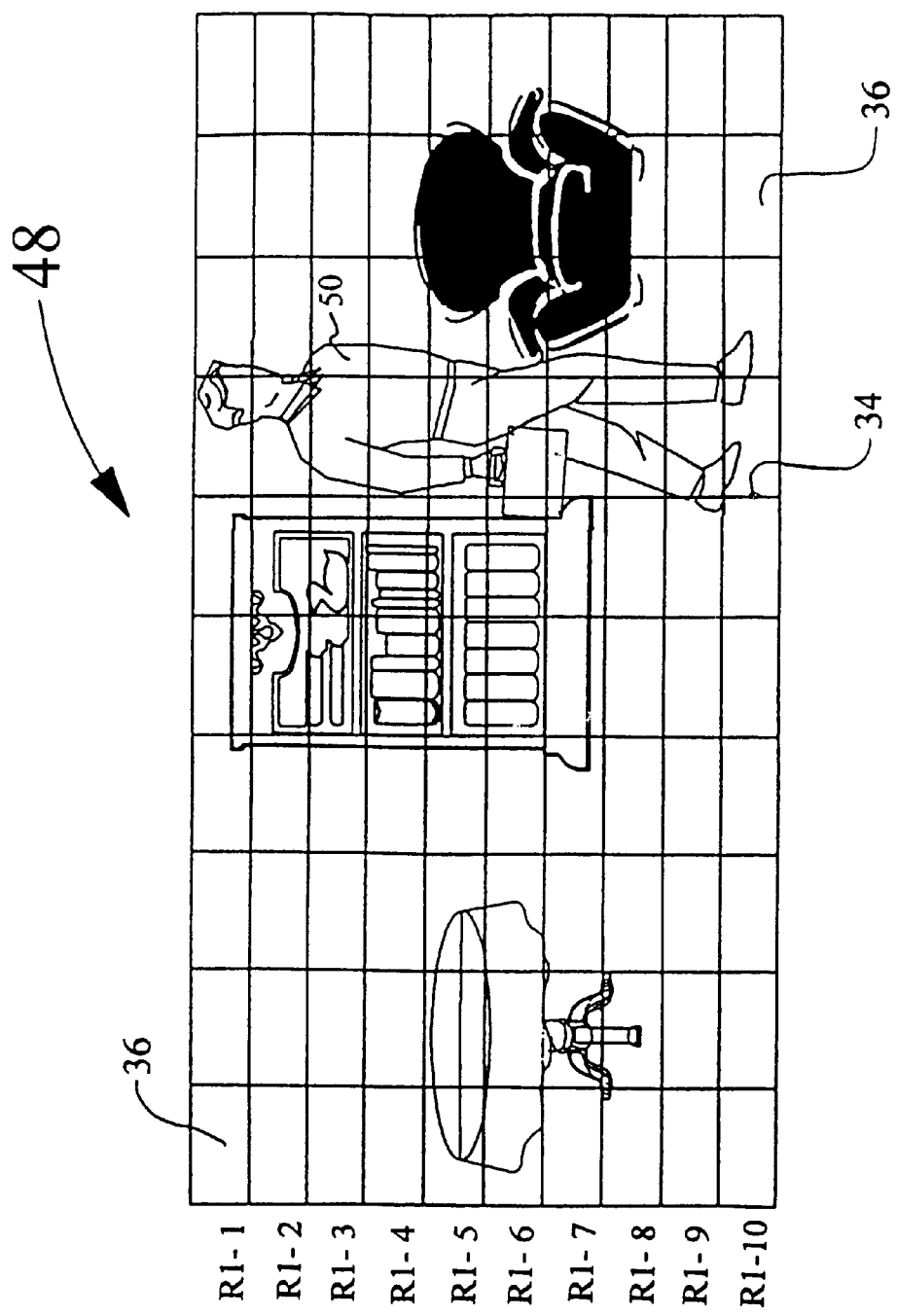
FIG. 5 is an alternative representation of a second image and array in accordance with present invention.

Referring also to FIG. 2, FIG. 3, FIG. 4 and FIG. 5, method for monitoring a field of view for visible changes, according to the present invention, is referred to generally by reference in 26. After the video image grabber 18 is initialized 28, a first or benchmark image 30 is taken by video camera 12 in a predetermined manner of the field of view 14 to be monitored, which is read 32, and then an array 34, which can be a matrix or grid or other array, divides the first image into a plurality of cells 36. The first image divided by the array is then stored, and a second image 38 is taken in the predetermined manner of the field of view to be monitored, which is captured 40. Array 34 is also applied to the second image, dividing the second image into the plurality of cells. The cells of each row R2-1 through R2-10 of the second image are grouped and the cells of each row R1-1 through R1-10 of the first image are grouped 42. The rows of the second image are then compared to the rows of the first image, and the number of the rows that changed from the first image to the second image is computed. This could, of course, be done using columns rather than rows, in which case step 42 would be "Sum of column sums," and in a preferred form, rows and columns are alternately compared. In some situations only certain groups are compared. If a parrot is moving around in a cage, then the cells which might show the parrot are not compared, or if there are several ceiling fans which are moving, then the cells which show the ceiling fans might not be compared. There are also other ways of handling these problems which are also shown. In the situation illustrated in FIG. 4, a cat 46 has moved into field of view 14 explained the first image and the second image. Cat 46 can occupy up to three rows. The compare against standard 44 portion of the program can simply be instructed to ignore changes in no more than three rows so that the cat will not give a false alarm. Referring now to FIG. 5, an alternative second image is referred to by reference number 48. In this case, a man 50 has entered field of view 14. Man 50 occupies all ten rows so that there is no danger in the present invention of thus taking man 50 for cat 46 or vice versa. If columns were used in this case, the man could take two to three columns as could the cat. Alternating comparisons of rows and columns or both avoids mistakes from such situations. Since man 50 occupies the same space as he moves, he can move within the image without triggering an alarm. FIG. 5 could, be the first image and FIG. 3 be the second image, in which case, the present system would detect man 50 leaving field of vision 14.

In one preferred form of the method, each cell of the first image is given a numerical value based upon the information in each cell, and each cell of the second image is also given a numerical value based upon the information in each cell. Computing how many groups of the cells changed from the first image to the second image is simply a matter of computing the difference between the numerical value of each cell in the second image and in the first image.

In a preferred arrangement, each cell comprises a pixel, the numerical value of each cell comprises the brightness of the pixel; and the numerical value of each group of cells comprises the sum of the brightness for the pixels in the group. In an arrangement wherein the predetermined groups of cells comprises a single group, the comparison number is a single number that can be quickly calculated since it is simply the sum of the pixel brightness numbers. Then the single number is compared for the first image and the second image. This can be implemented with a minimum of computer power, making it easy to monitor many different cameras. In a more general sense, if we define "image mass" as anything which can be measured about an image, such as the sum of the brightness numbers for all of the pixels, then a preferred form of the present invention is to compare the image mass of the first image with the image mass of the second image. Such a system makes it possible for a guard station to operate with a single monitor, television or other video screen. Whenever a significant change is detected, then the monitor, television or other video screen is switched to that camera where the change was detected, while sounding an audible alarm at the guard station to alert the guard that a change has been detected. Besides relieving the tedium of monitoring many different sites where nothing is happening, it would simplify monitoring so that many different sites could actually be monitored at a police station. Once the alarm has been sounded, then whoever is monitoring the site can display both the benchmark image and the image which changed enough to trigger the alarm in addition to the current image as well as live action. If it appears to be a false alarm, then the person monitoring the site can reset a new benchmark from the computer.

In one method according to the present invention, the number of the cells or groups of cells and which changed in numerical value by more than a predetermined amount is also computed.

One method, according to the present invention, also includes the step of comparing 44 the number of the groups of cells that changed from the first image to the second image to a predetermined number. If the parrot moving in its cage, or a cat climbing on the furniture is small enough to never be in more than the predetermined number of groups of cells, then if more than the predetermined number of groups of cells changed, then it was not caused by the parrot or the cat.

Another method, according to the present invention, for monitoring a field of view for visible changes, includes the steps of taking a sequence of video images in a predetermined manner of the field of view to be monitored, creating a sequence of images, and creating an array which divides each of the images into a plurality of cells. Each image divided by the array is stored and groups of the cells of each image are compared to the same groups of cells of the other images. Again, this could just be predetermined groups of cells which add to less than all of the cells. It is then computed if there is a cyclical change in any of the predetermined groups of cells during the sequence. This cyclical change could be the rotation of a ceiling fan or the movement of a flower arrangement caused by the blowing of an air conditioner. Similar to that already described, each cell of each image is given a numerical value based upon the information in that cell, and computing if there is a cyclical change in any of the predetermined groups of cells during the sequence becomes computing if there is a cyclical change in any of the numerical values of the predetermined groups of cells during the sequence. In a preferred form, the number of the predetermined cells that changed from one image of the sequence to the next image of the sequence and was not part of a cyclical change is computed.

Figure 6:
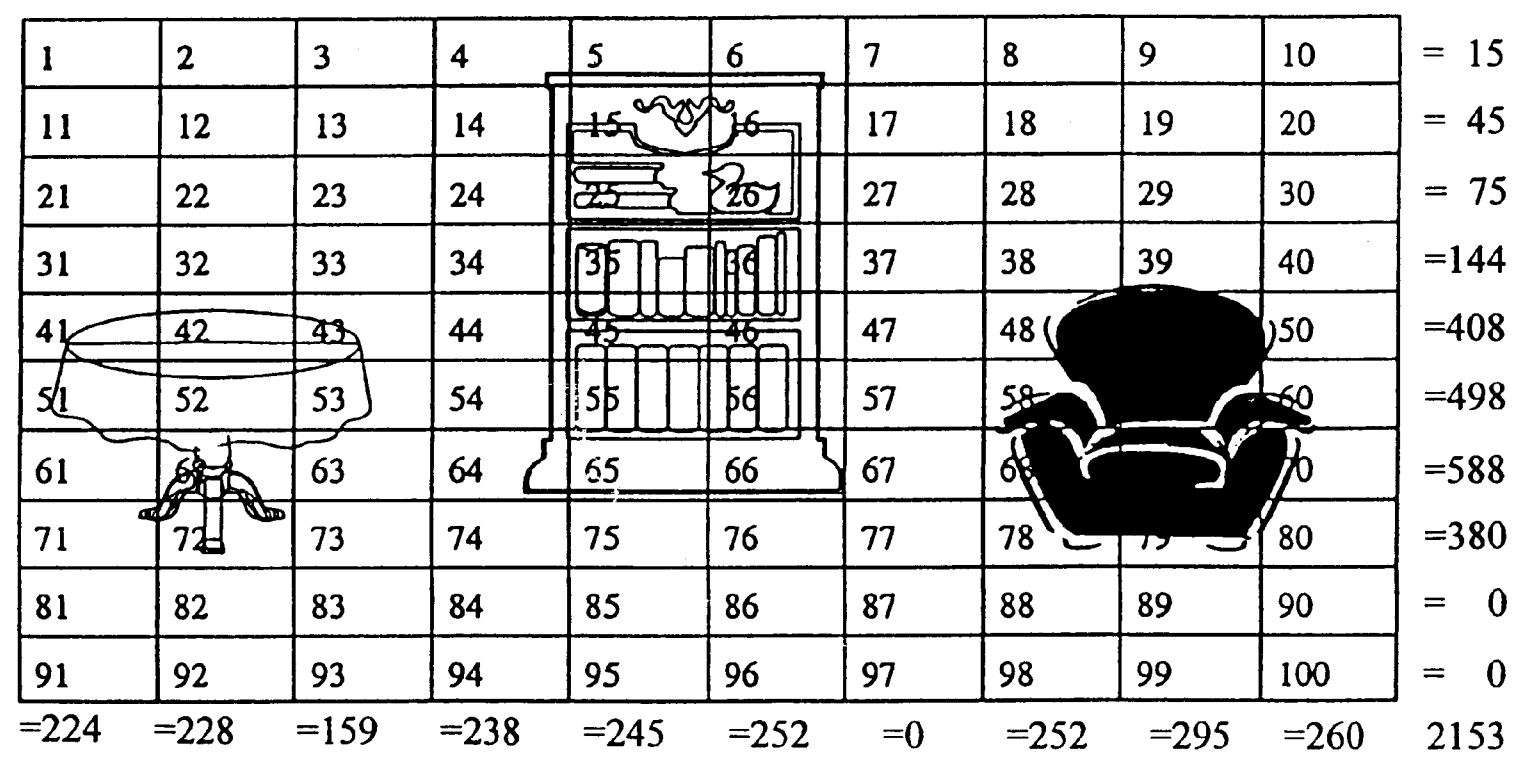

Referring now specifically to FIG. 6, one image algorithm according to the present invention sums rows or columns of cells by assigning each cell a unique numerical value. In the case illustrated, the cells are numbered from left to right beginning at the top. The value of each cell is added to the value of a row or column if a visible item, other than background such as wallpaper, occupies part of that cell. For the field of view illustrated, a table occupies cells 41, 42, 43, 51, 52, 53, 61, 62, 63, 71 and 72. A bookcase occupies cells 4, 5, 6, 14, 15, 16, 24, 25, 26, 34, 35, 36, 44, 45, 46, 54, 55, 56, 64, 65 and 66. A chair occupies cells 39, 48, 49, 50, 58, 59, 60, 68, 69,70,78,79 and 80. The value of groups, where a group is a row, far from the top: 15, 45, 75, 144, 408, 498, 588, 380, zero and zero. This algorithm has several advantages over using image compression. The algorithm is very simple, for each cell has affixed value which uses that value when the cell is occupied and a value of zero when that cell is not occupied. The value of a row is equal to the sum of the occupied cell numbers in that row and the value of a column is equal to the cum of the occupied cell numbers in that column.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

What is claimed is:

1. A method for monitoring a field of view for visible changes, comprising in combination the steps of:
    taking a first image in a predetermined manner of the field of view to be monitored;
    dividing the first image into a plurality of cells;
    taking a second image in the predetermined manner of the field of view to be monitored after creating the first image;
    dividing the second image into the plurality of cells;
    comparing predetermined groups of cells of the second image to the same predetermined groups of cells of the first image;
    giving each cell of the first image a numerical value based upon the information in each cell;
    giving each cell of the second image a numerical value based upon the information in each cell;
    giving each group of cells a numerical value based upon the numerical value of the cells within that group; and
    wherein comparing predetermined groups of cells of the second image to the same predetermined groups of cells in the first image comprises computing the difference between the numerical values of each group of cells in the second image and in the first image.

2. A method according to claim 1 wherein:
    each cell comprises a pixel; and
    the numerical value of each cell comprises the brightness of the pixel.

3. A method according to claim 2 wherein the numerical value of each group of cells comprises the sum of the brightness for the pixels in the group.

4. A method according to claim 3 wherein the predetermined groups of cells comprises a single group.

5. A method for monitoring a field of view for visible changes, comprising in combination the steps of:
    taking a first image in a predetermined manner of the field of view to be monitored;
    dividing the first image into a plurality of areas;
    taking a second image in the predetermined manner of the field of view to be monitored after creating the first image;
    dividing the second image into the plurality of areas;
    comparing predetermined areas of the second image to the same areas of the first image;
    computing the number of the predetermined areas that changed from the first image to the second image;
    dividing each area of the first image a numerical value based upon the information in each area;
    giving each area of thief second image a numerical value based upon the information in each area; and
    wherein computing the number of the predetermined areas that changed from the first image to the second image comprises computing the difference between the numerical values of each area in the second image and in the first image.

6. A method according to claim 5 further comprising the step of computing the number of the predetermined areas that changed in numerical value by more than a predetermined amount.

7. A method according to claim 5 further comprising the step of computing the number of the predetermined areas that changed in numerical value by more than a predetermined amount.

8. A method according to claim 7 further comprising the step of comparing the number of the predetermined areas that changed from the first image to the second image to a predetermined number.

9. A method according to claim 8, further comprising the steps of:
    giving each area of the first image a numerical value based upon the information in each area;
    giving each area of the second image a numerical value based upon the information in each area; and
    wherein computing the number of the predetermined areas that changed from the first image to the second image comprises computing the difference between the numerical values of each areas in the second image and in the first image.

10. A method according to claim 9 further comprising the step of computing the number of the predetermined areas that changed in numerical value by more than a predetermined amount.

11. A method for monitoring a field of view for visible changes, comprising in combination the steps of:
    taking a sequence of images in a predetermined manner of the field of view to be monitored;
    dividing each of the images into an identical plurality of areas;
    comparing a plurality of predetermined areas of each image to the same areas of the other images;
    computing if there is a cyclical change in any of the predetermined areas during the sequence;

giving each area of each image a numerical value based upon the information in that area; and wherein computing if there is a cyclical change in any of the predetermined areas during the sequence comprises computing if there is a cyclical change in any of the numerical values of the predetermined areas during the sequence.

12. A method according to claim 11, further comprising the step of computing the number of the predetermined areas that changed from one image of the sequence to the next image of the sequence and was not part of a cyclical change.

13. A method according to claim 11, further comprising the step of computing the number of the predetermined areas that changed from one image of the sequence to the next image of the sequence and was not part of a cyclical change.

14. A method for monitoring a field of view for visible changes, comprising in combination the steps of:

taking a sequence of images in a predetermined manner of the field of view to be monitored;

dividing each of the images into a plurality of cells;

comparing a plurality of predetermined groups of cells of each image to the same groups of cells of the other images;

computing if there is a cyclical chance in any of the predetermined groups of cells during the sequence;

giving each cell of each image a numerical value based upon the information ill that cell;

giving each group of cells of each image a numerical value based upon the numerical value of the cells within that group; and wherein computing ii there is a cyclical chance in any of the predetermined groups of cells during the sequence comprises computing if there is a cyclical change in any of the numerical values of the predetermined groups of cells during the sequence.

15. A method according to claim 14, wherein:

each cell comprises a pixel;

the numerical value of each cell comprises the brightness of the pixel; and the numerical value of each group of cells comprises the slum of the brightness for the pixels in the group.

16. A method according to claim 15, wherein the predetermined groups of cells comprises a single group.

* * * * *